Jan. 4, 1966  S. L. ZIMMERMAN  3,227,222
CABBAGE HARVESTER
Filed Feb. 18, 1964  4 Sheets-Sheet 1

FIG. I.

INVENTOR
SAMUEL L. ZIMMERMAN
BY Munson H. Lane
ATTORNEY

Jan. 4, 1966   S. L. ZIMMERMAN   3,227,222
CABBAGE HARVESTER

Filed Feb. 18, 1964   4 Sheets-Sheet 4

INVENTOR
SAMUEL L. ZIMMERMAN
BY *Munson H. Lane*
ATTORNEY

United States Patent Office 3,227,222
Patented Jan. 4, 1966

3,227,222
CABBAGE HARVESTER
Samuel L. Zimmerman, R.D. 1, Stanley, N.Y.
Filed Feb. 18, 1964, Ser. No. 345,701
2 Claims. (Cl. 171—31)

This invention relates to new and useful improvements in harvesters, and the principal object of the invention is to provide a machine of the character herein described which is especially adapted for harvesting of cabbage.

While numerous machines have been designed for the purpose of harvesting beets, such machines are wholly unsuitable for harvesting cabbage, notwithstanding some botanical similarities possessed by these two kinds of vegetables. The cabbage harvester of the present invention is structurally arranged so as to gently remove cabbages with their roots from the ground, to deposit them on a moving conveyor for delivery to rotary saw means where the roots of the cabbages are cut off, loose soil and other foreign matter falling from the cabbages during their travel along the conveyor to the saw means, and to deliver rootless cabbages from the saw means by another conveyor for loading into a suitable truck or wagon traveling alongside the harvester.

The harvesting machine of the invention is simple in construction, efficient in operation, durable, and inexpensive to manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 6 is an enlarged, fragmentary sectional detail of one of the impeller paddles, taken substantially in the plane of the line 6—6 in FIGURE 1; and FIGURE 7 is a sectional detail, taken substantially in the plane of the line 7—7 in FIGURE 6.

Figure 1:
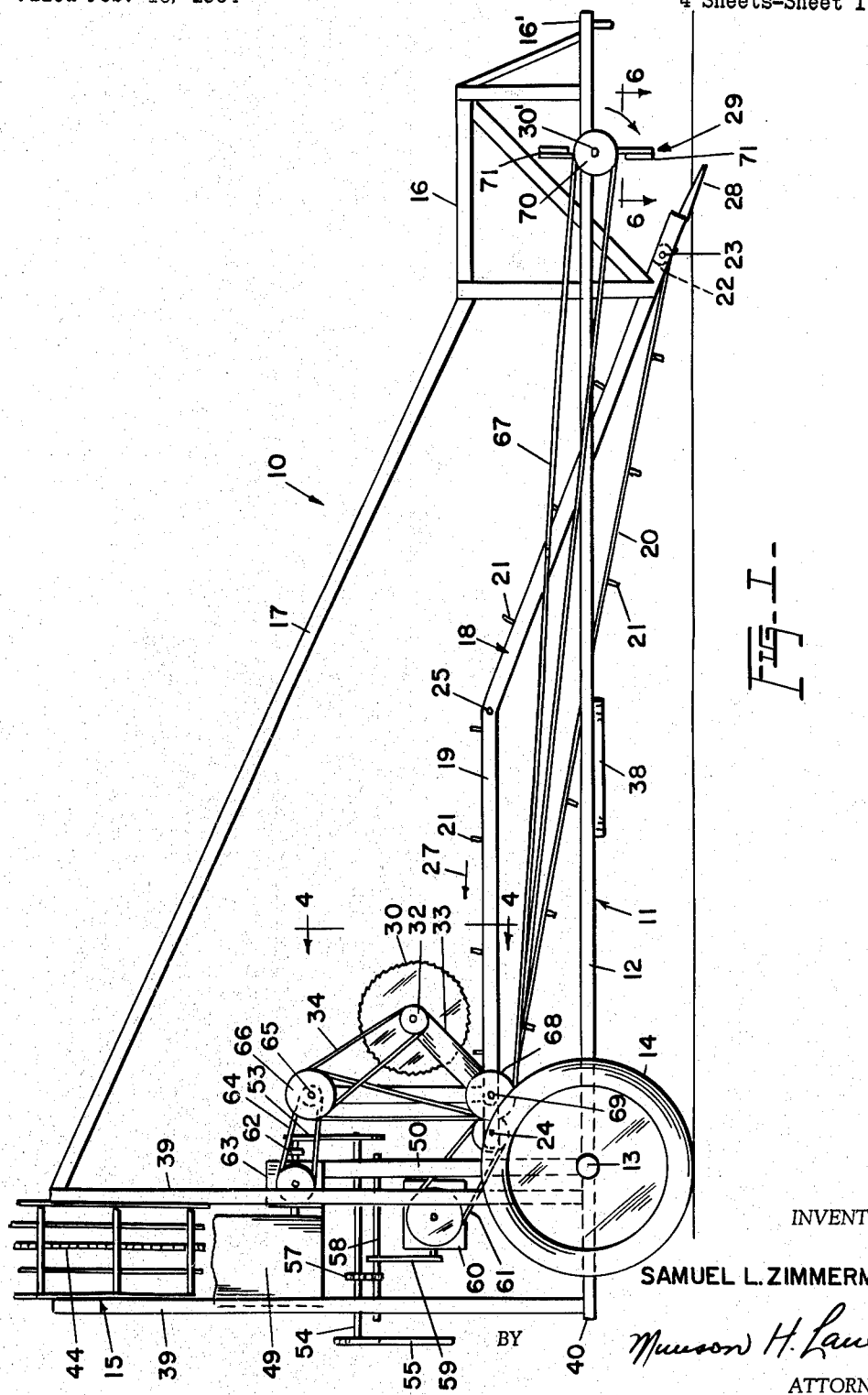
FIGURE 1 is a side elevational view of a cabbage harvester in accordance with the invention.
Figure 2:
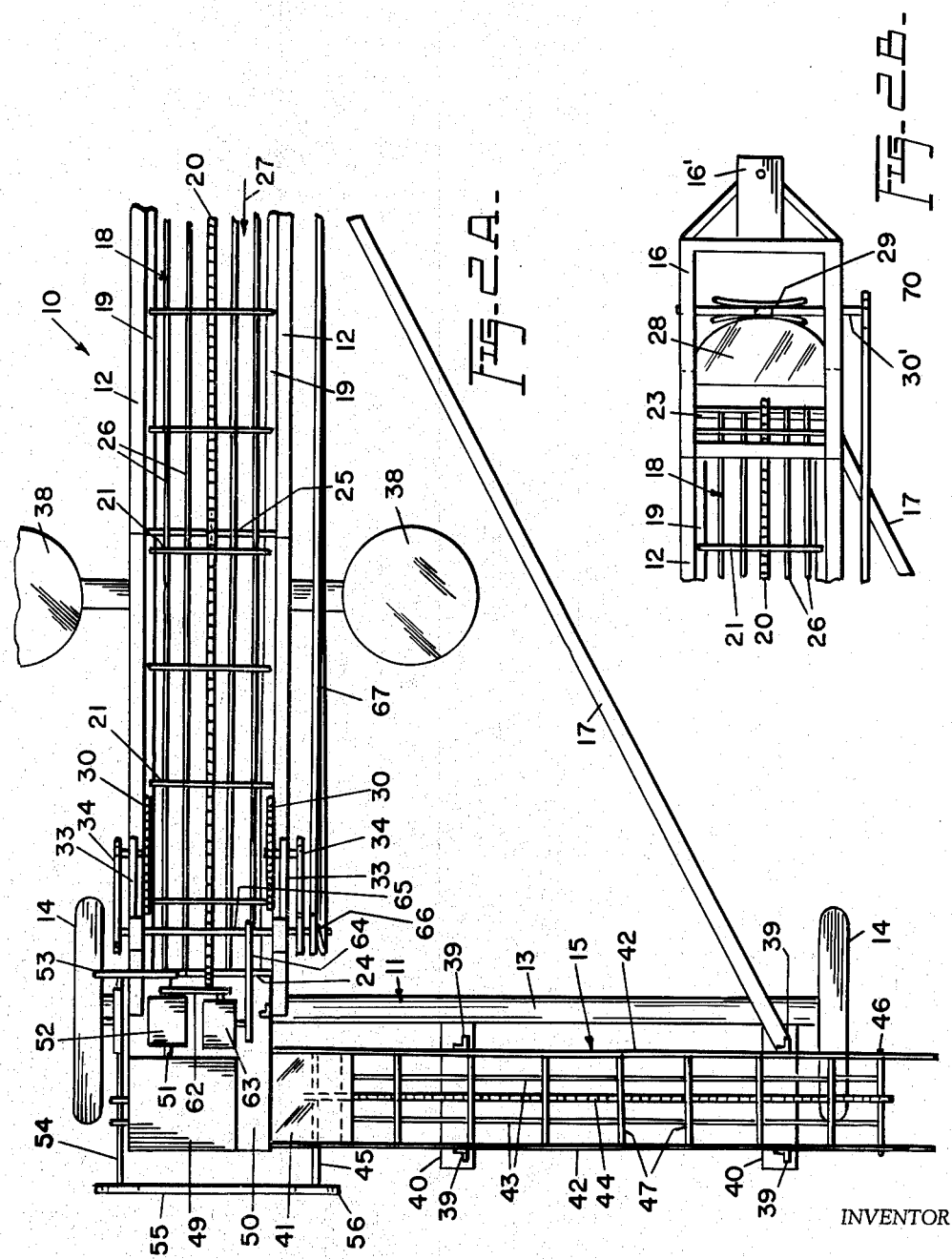
FIGURE 2A is a fragmentary top plan view thereof.
FIGURE 2B is a fragmentary top plan view of the front end portion of the harvester chassis which does not appear in FIGURE 2A.
Figure 3:
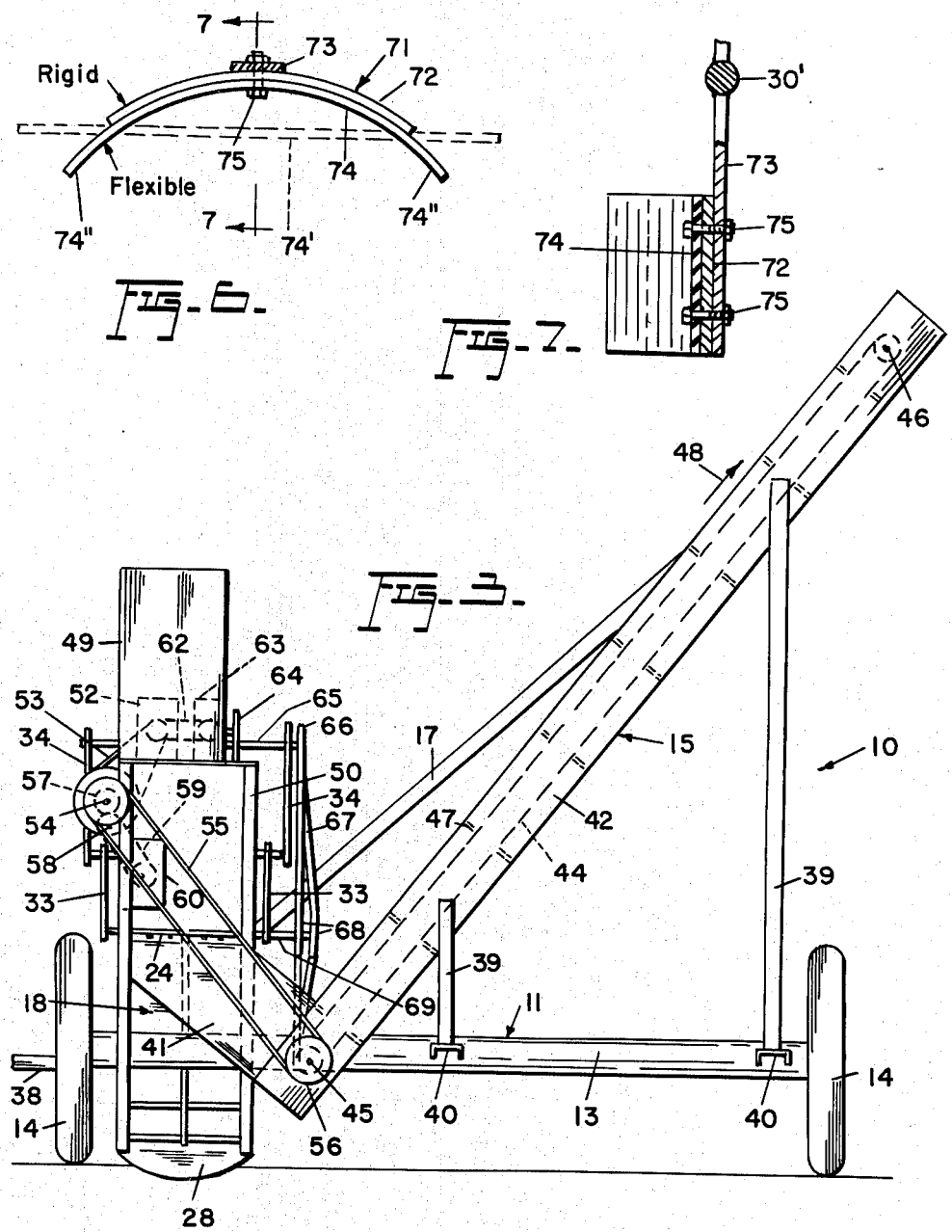
FIGURE 3 is a rear end elevational view of the harvester.

Referring now to the accompanying drawings in detail, more particularly to FIGURES 1–3 inclusive, the cabbage harvester of the invention is designated generally by the reference numeral 10 and embodies in its construction a chassis 11 which includes, among other things, a pair of horizontal, forwardly and rearwardly extending frame members, one of which appears at 12 in FIG. 1.

The chassis 11 also includes a transverse axle 13 which is secured to the rear end portions of the frame members 12 and carries a pair of traveling wheels 14, it being noted in FIGS. 2A and 3 that the axle 13 projects to one side for supporting a conveyor assembly 15 hereinafter described. The front end portions of the frame members 12 carry a rigid framework 16 including a draw bar 16' by which the entire machine may be connected to a tractor, or the like. For purposes of reinforcement, a diagonal brace 17 extends from the framework 16 to the conveyor assembly 15, as shown.

Figure 4:
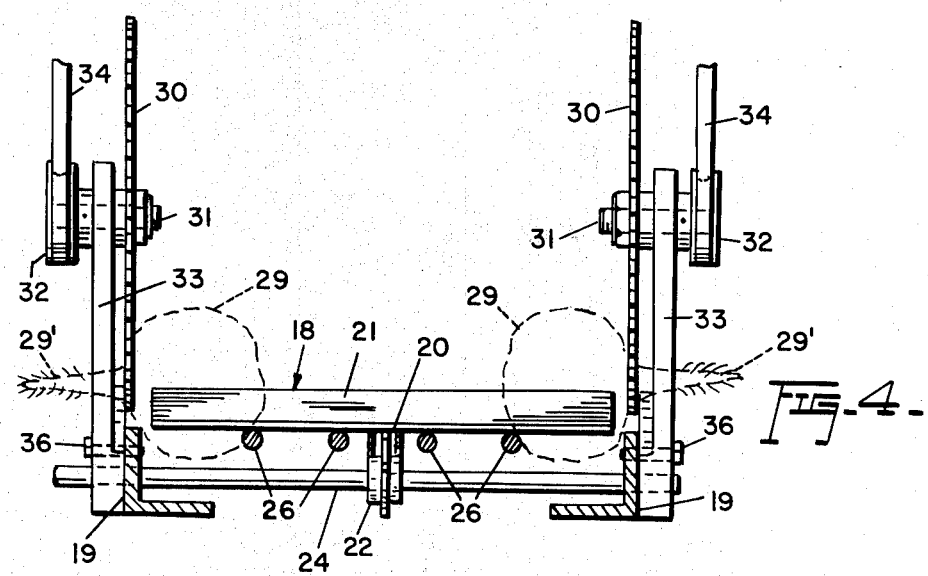
FIGURE 4 is an enlarged, fragmentary cross-sectional view, taken substantially in the plane of the line 4—4 in FIGURE 1.

A rearwardly inclined slat conveyor assembly 18 is supported by the frame members 12 of the chassis. As is best shown in FIG. 4, the conveyor assembly 18 comprises a pair of spaced parallel side rails 19 with an endless chain 20 disposed centrally therebetween, the chain being equipped with transverse slats 21. As seen in FIG. 1, the conveyor rails 19 are angulated intermediate the ends of the conveyor so that while the front portion of the conveyor is inclined, its rear portion is substantially horizontal. The conveyor chain 20 passes around sprockets 22 mounted on transverse shafts 23, 24 at the respective front and rear ends of the conveyor and the upper run of the conveyor chain also passes over a sprocket carried by a transverse shaft 25 at the angulation point of the rails 19, as will be apparent from FIGS. 1 and 2A. In the upper run of the conveyor the slats 21 slide along a set of spaced parallel rods 26 which are suitably mounted between the rails 19, and if desired, similar rods (not shown) may be provided to prevent the lower run of the conveyor from sagging, it being understood of course, that the conveyor is driven so that its upper run travels in the direction of the arrow 27.

At the front end of the conveyor 18 the side rails 19 support a fixedly mounted digger blade 28 which penetrates the ground and serves to dig up cabbages with their roots intact. A rotatable impeller 29, hereinafter described in detail, is mounted on a transverse shaft 30 journalled in the chassis above but adjacent to the digger blade 28, the rotary impeller serving to deposit unto the conveyor 18 the cabbages which have been dug up by the blade 28. It will be apparent that as the cabbages travel along the upper run of the conveyor 18, as indicated by the dotted lines 29 in FIG. 4, any loose soil or other foreign matter will drop off the cabbages to the ground through the spaces between the side rails 19 and rods 26 of the conveyor.

Figure 5:
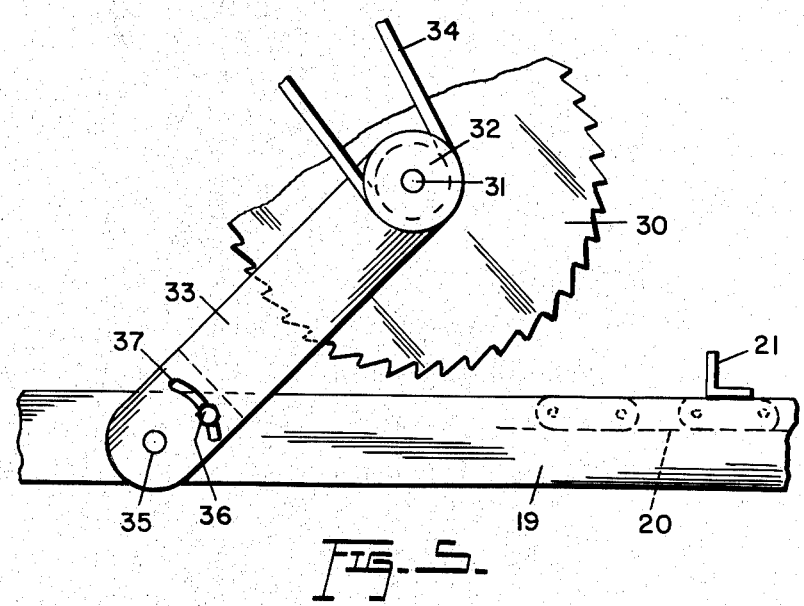
FIGURE 5 is a fragmentary side elevational view of the saw means shown in FIGURE 4.

Provided adjacent the rear end of the level or horizontal rear end portion of the conveyor 18 is a pair of circular saws 30 which are used for cutting the roots 29' off the cabbages as the latter pass the saws along the conveyor. The saws 30 rotate in vertical planes which are in substantial alignment with the conveyor side rails 19, each saw being secured to a stub shaft 31 which also carries a drive pulley 32 and is rotatably journalled in the upper end portion of a radius arm 33, one such arm being provided for each saw at each side of the conveyor, as will be clearly apparent. The two saws are driven by separate belts 34 passing around the respective pulleys 32, the belt tension being adjustable by virtue of pivotal mountings of the lower ends of the radius arms 33 to the rails 19 as at 35 (see FIG. 5). Suitable bolts or screws 36 are provided on the rails 19 and extend through arcuate slots 37 in the arms 33 for locking the latter in a desired position.

As the cabbages travel along the conveyor 18 toward the root cutting saws 30, they are pushed by the conveyor slats 21 along the rods 26. Suitable seats or platforms 38 are secured to the chassis 11 at opposite sides of the conveyor 18, somewhat in advance of the saws 30, and attendants stationed on these seats supervise the flow of cabbages along the conveyor and manually locate them, if necessary, so that the cabbages ride along the side rails 19 with their roots oriented laterally outwardly as indicated in FIGURE 4, for cutting off of the roots by the saws. The cut off roots, of course, drop to the ground, while the rootless cabbage heads continue their travel on the conveyor 18, from the rear end of which they are ultimately discharged onto the lower end of the aforementioned conveyor 15.

The conveyor 15 is supported on the chassis 11 by suitable uprights 39 supported by channels 40 on the axle 13, in addition to the support afforded by the aforementioned brace 17. The arrangement is such that cabbages discharged from the rear end of the conveyor 18 pass through a chute 41 onto the lower end of the conveyor 15 which extends upwardly and laterally outwardly as shown in FIGURE 3, for convenient loading of the harvested cabbage into a truck, wagon, or the like (not shown) traveling alongside of the harvesting machine 10. The conveyor 15 is quite similar in construction to the conveyor 18, including parallel side members 42, spaced parallel rods 43 therebetween, an endless chain 44 passing around sprockets on shafts 45, 46, and a set of slats 47 secured to the chain, as will be readily understood. The upper run of the conveyor moves in the direction of the arrow 48 in FIGURE 3.

Means are provided for driving the various movable components of the harvester. If desired, such means may be actuated by the power takeoff of the tractor by which the harvester is drawn, but preferably the driving means comprise a prime mover such as a suitable engine or motor 49 mounted on a framework 50 which is carried by the rear portion of the chassis 11. The drive shaft 51 of the motor 49 is coupled to a clutched gear box 52 which is connected by a belt or chain drive 53 to a shaft 54. The latter, in turn, is connected by a belt or chain drive 55 to a pulley or sprocket 56 on the aforementioned shaft 45, whereby drive is imparted to the loading conveyor 15.

The shaft 54 is operatively connected by suitable gearing 57 to a parallel shaft 58 which, in turn, is coupled by a belt or chain drive 59 to a reduction gear box 60. he gear box 60 drives the conveyor 18 through a belt or chain drive 61, extending from the gear box 60 to the conveyor drive shaft 24 (see FIG. 1).

The aforementioned gear box 52 is also connected by a belt or chain drive 62 to a second gear box 63 which, in turn, is connected by a belt or chain drive 64 to a shaft 65 from which drive to the two saws 30 is taken by the aforementioned belts 34. The shaft 65 also carries a pulley 66, from which a belt drive 67 is taken over a pair or juxtaposed pulleys 68 on an idler shaft 69 journalled in the side rails 19 of the conveyor 18. After passing around the pulleys 68, the belt drive 67 is taken to a pulley 70 on the shaft 30 for driving the impeller 29.

Referring now to the construction of the impeller 29, the same comprises a plurality of paddles 71 which are secured to the shaft 30. Each of the paddles 71, as is best shown in FIGURES 6 and 7, consists of an elongated convexo-concave paddle member 72 made of rigid material such as metal and provided intermediate its ends with a support bar 73 by which it is secured to the shaft 30. A resiliently flexible liner 74 is positioned against the cancave side of the paddle member 72 and is secured thereto by suitable bolts or screws 75, which may also serve to attach the paddle member to the support bar 73, if so desired. Before its application to the paddle member, the liner 74 is flat as indicated by the dotted lines 74', but when the liner is fastened in place, it becomes curved in conformity to the concave surface of the paddle member. The liner is somewhat longer than the paddle member, so that when it is installed in position, end portions of the liner project laterally outwardly beyond the side edges of the paddle member to provide a pair of resiliently flexible wings 74". The provision of the resilient liner in the paddle member safeguards cabbage against possible bruising or other damage while being deposited by the impeller onto the conveyor 18.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In a cabbage harvester, the combination of a chassis, a rearwardly inclined slat conveyor carrier by said chassis, a fixed digger blade provided at the front end of said conveyor, an impeller rotatably mounted on said chassis above and adjacent to said digger blade for delivering cabbages dug up by said blade onto said conveyor, means for driving said conveyor, and means for rotating said impeller, said impeller comprising a transverse shaft, and a set of transversely elongated paddles secured to said shaft, each of said paddles of said impeller comprising a convexo-concave paddle member of rigid material secured to said shaft, and a resilient liner secured to the concave side of said paddle member.

2. The device as defined in claim 1 wherein said paddle member is curved in a transverse direction and includes a pair of outer side edges, said resilient liner projecting laterally beyond said outer side edges of the paddle member and the projecting side edge portions of the liner being resiliently flexible.

References Cited by the Examiner

UNITED STATES PATENTS

| | | | |
|---|---|---|---|
| 1,218,860 | 3/1917 | Heyer | 146—85 XR |
| 2,193,205 | 3/1940 | North | 146—85 XR |
| 2,252,799 | 8/1941 | Cooper et al. | 146—85 |
| 2,595,340 | 5/1952 | Diethelm | 56—220 XR |

ABRAHAM G. STONE, *Primary Examiner.*

ANTONIO F. GUIDA, *Examiner.*